United States Patent
Seo et al.

(10) Patent No.: US 7,643,398 B2
(45) Date of Patent: *Jan. 5, 2010

(54) RECORDING MEDIUM HAVING DATA STRUCTURE FOR MANAGING REPRODUCTION OF DATA STREAMS RECORDED THEREON AND RECORDING AND REPRODUCING METHODS AND APPARATUSES

(75) Inventors: Kang Soo Seo, Kyunggi-do (KR); Byung Jin Kim, Kyunggi-do (KR)

(73) Assignee: LG Electronics Inc., Seoul (KR)

( * ) Notice: Subject to any disclaimer, the term of this patent is extended or adjusted under 35 U.S.C. 154(b) by 187 days.

This patent is subject to a terminal disclaimer.

(21) Appl. No.: 12/000,490

(22) Filed: Dec. 13, 2007

(65) Prior Publication Data

US 2008/0095027 A1    Apr. 24, 2008

Related U.S. Application Data

(63) Continuation of application No. 11/802,659, filed on May 24, 2007, which is a continuation of application No. 10/772,326, filed on Feb. 6, 2004, now Pat. No. 7,224,664.

(30) Foreign Application Priority Data

Mar. 25, 2003  (KR) .................. 10-2003-018416

(51) Int. Cl.
G11B 7/24 (2006.01)

(52) U.S. Cl. ............... 369/275.3; 369/275.1; 369/47.15

(58) Field of Classification Search ... 369/275.1–275.5, 369/47.15, 53.2; 386/95
See application file for complete search history.

(56) References Cited

U.S. PATENT DOCUMENTS

| 5,521,898 A | 5/1996 | Ogasawara |
| 5,559,808 A | 9/1996 | Kostreski et al. |
| 5,602,956 A | 2/1997 | Suzuki et al. |

(Continued)

FOREIGN PATENT DOCUMENTS

CN     1134583    10/1996

(Continued)

OTHER PUBLICATIONS

European Office Action corresponding to European Application No. 04711050.7 dated Dec. 9, 2008.

(Continued)

*Primary Examiner*—Ali Neyzari
(74) *Attorney, Agent, or Firm*—Harness, Dickey & Pierce, P.L.C.

(57) ABSTRACT

The data structure includes a navigation area of a computer readable medium storing navigation data associated with a data stream representing a portion of at least one reproduction path. The navigation data includes indication information, and the indication information indicates whether the data stream represents multiple reproduction paths or the data stream represents a single reproduction path. If the indication information indicates the data stream represents multiple reproduction paths, the navigation data includes path number information and an indicator associated with each reproduction path. The path number information identifies a number of the multiple reproduction paths, and each indicator indicates a file associated with the associated one of the multiple reproduction paths.

28 Claims, 8 Drawing Sheets

U.S. PATENT DOCUMENTS

| | | | |
|---|---|---|---|
| 5,651,010 A | 7/1997 | Kostreski et al. |
| 5,729,549 A | 3/1998 | Kostreski et al. |
| 5,732,185 A | 3/1998 | Hirayama et al. |
| 5,742,569 A | 4/1998 | Yamamoto et al. |
| 5,747,136 A | 5/1998 | Shono et al. |
| 5,771,334 A | 6/1998 | Yamauchi et al. |
| 5,784,528 A | 7/1998 | Yamane et al. |
| 5,819,003 A | 10/1998 | Hirayama et al. |
| 5,835,493 A | 11/1998 | Magee et al. |
| 5,854,873 A | 12/1998 | Mori et al. |
| 5,870,523 A | 2/1999 | Kikuchi et al. |
| 5,877,817 A | 3/1999 | Moon |
| 5,884,004 A | 3/1999 | Sato et al. |
| 5,909,257 A | 6/1999 | Ohishi et al. |
| 5,913,010 A | 6/1999 | Kaneshige et al. |
| 5,940,255 A | 8/1999 | Uwabo et al. |
| 5,949,792 A | 9/1999 | Yasuda et al. |
| 5,953,187 A | 9/1999 | Uwabo et al. |
| 5,987,126 A | 11/1999 | Okuyama et al. |
| 5,999,698 A | 12/1999 | Nakai et al. |
| 6,031,962 A | 2/2000 | Sawabe et al. |
| 6,035,095 A | 3/2000 | Kaneshige et al. |
| 6,064,796 A | 5/2000 | Nakamura et al. |
| 6,067,400 A | 5/2000 | Saeki et al. |
| 6,167,189 A | 12/2000 | Taira et al. |
| 6,181,870 B1 | 1/2001 | Okada et al. |
| 6,181,872 B1 | 1/2001 | Yamane et al. |
| 6,195,726 B1 | 2/2001 | Hogan |
| 6,219,488 B1 | 4/2001 | Mori et al. |
| 6,222,805 B1 | 4/2001 | Mori et al. |
| 6,285,825 B1 | 9/2001 | Miwa et al. |
| 6,321,027 B2 | 11/2001 | Honjo |
| 6,336,002 B1 | 1/2002 | Yamauchi et al. |
| 6,343,062 B1 | 1/2002 | Furukawa et al. |
| 6,351,442 B1 | 2/2002 | Tagawa et al. |
| 6,353,613 B1 | 3/2002 | Kubota et al. |
| 6,360,055 B1 | 3/2002 | Kaneshige et al. |
| 6,377,747 B1 | 4/2002 | Murase et al. |
| 6,385,388 B1 | 5/2002 | Lewis et al. |
| 6,385,389 B1 | 5/2002 | Maruyama et al. |
| 6,385,398 B1 | 5/2002 | Matsumoto |
| 6,393,574 B1 | 5/2002 | Kashiwagi et al. |
| 6,415,101 B1 | 7/2002 | deCarmo et al. |
| 6,424,797 B1 | 7/2002 | Murase et al. |
| 6,445,872 B1 | 9/2002 | Sano et al. |
| 6,470,140 B1 | 10/2002 | Sugimoto et al. |
| 6,470,460 B1 | 10/2002 | Kashiwagi et al. |
| 6,504,996 B1 | 1/2003 | Na et al. |
| 6,515,101 B1 | 2/2003 | Sheares |
| 6,546,195 B2 | 4/2003 | Kashiwagi et al. |
| 6,556,774 B2 | 4/2003 | Tsumagari et al. |
| 6,564,006 B1 | 5/2003 | Mori et al. |
| 6,567,608 B2 | 5/2003 | Mori et al. |
| 6,573,819 B1 | 6/2003 | Oshima et al. |
| 6,584,277 B2 | 6/2003 | Tsumagari et al. |
| 6,603,517 B1 | 8/2003 | Shen et al. |
| 6,618,396 B1 | 9/2003 | Kondo et al. |
| 6,654,543 B2 | 11/2003 | Ando et al. |
| 6,788,883 B1 | 9/2004 | Park et al. |
| 6,801,713 B1 | 10/2004 | Yagawa et al. |
| 6,901,078 B2 | 5/2005 | Morris |
| 6,904,227 B1 | 6/2005 | Yamamoto et al. |
| 7,024,102 B1 | 4/2006 | Inoshita et al. |
| 7,072,573 B2 | 7/2006 | Okada et al. |
| 7,106,946 B1 | 9/2006 | Kato |
| 7,124,303 B2 | 10/2006 | Candelore et al. |
| 7,236,687 B2 | 6/2007 | Kato et al. |
| 2001/0033517 A1 | 10/2001 | Ando et al. |
| 2001/0038745 A1 | 11/2001 | Sugimoto et al. |
| 2001/0043790 A1 | 11/2001 | Saeki et al. |
| 2001/0053280 A1 | 12/2001 | Yamauchi et al. |
| 2002/0015383 A1 | 2/2002 | Ueno |
| 2002/0015581 A1 | 2/2002 | Ando et al. |
| 2002/0021761 A1 | 2/2002 | Zhang et al. |
| 2002/0031336 A1 | 3/2002 | Okada et al. |
| 2002/0046328 A1 | 4/2002 | Okada |
| 2002/0076201 A1 | 6/2002 | Tsumagari et al. |
| 2002/0097981 A1 | 7/2002 | Seo et al. |
| 2002/0097984 A1 | 7/2002 | Abecassis |
| 2002/0106196 A1 | 8/2002 | Yamauchi et al. |
| 2002/0127002 A1 | 9/2002 | Mori et al. |
| 2002/0145702 A1 | 10/2002 | Kato et al. |
| 2002/0159368 A1 | 10/2002 | Noda et al. |
| 2002/0180803 A1 | 12/2002 | Kaplan et al. |
| 2002/0196365 A1 | 12/2002 | Cho et al. |
| 2002/0197059 A1 | 12/2002 | Cho et al. |
| 2003/0002194 A1 | 1/2003 | Andoh |
| 2003/0026597 A1 | 2/2003 | Cho et al. |
| 2003/0118327 A1 | 6/2003 | Um et al. |
| 2003/0123849 A1 | 7/2003 | Nallur et al. |
| 2003/0133509 A1 | 7/2003 | Yanagihara et al. |
| 2003/0161615 A1 | 8/2003 | Tsumagari et al. |
| 2003/0221055 A1 | 11/2003 | Okada |
| 2003/0235403 A1 | 12/2003 | Seo et al. |
| 2003/0235404 A1 | 12/2003 | Seo et al. |
| 2004/0086261 A1 | 5/2004 | Hanes |
| 2004/0156621 A1 | 8/2004 | Seo et al. |
| 2004/0179819 A1 | 9/2004 | Cho et al. |
| 2004/0179820 A1 | 9/2004 | Kashiwagi et al. |
| 2004/0179827 A1 | 9/2004 | Cho et al. |
| 2004/0247290 A1 | 12/2004 | Seo et al. |
| 2004/0252975 A1 | 12/2004 | Cho et al. |
| 2005/0025459 A1 | 2/2005 | Kato et al. |
| 2005/0036763 A1 | 2/2005 | Kato et al. |
| 2006/0222340 A1 | 10/2006 | Yamauchi et al. |

FOREIGN PATENT DOCUMENTS

| | | |
|---|---|---|
| CN | 1150293 | 5/1997 |
| CN | 1197573 | 10/1998 |
| CN | 1220458 | 6/1999 |
| CN | 1237852 | 12/1999 |
| CN | 1251461 | 4/2000 |
| EP | 0723216 | 7/1996 |
| EP | 0 737 980 | 10/1996 |
| EP | 0836183 | 4/1998 |
| EP | 0836189 | 4/1998 |
| EP | 0847198 | 6/1998 |
| EP | 0873022 | 10/1998 |
| EP | 0 896 337 A2 | 2/1999 |
| EP | 0917355 | 5/1999 |
| EP | 0918438 | 5/1999 |
| EP | 0 920 203 | 6/1999 |
| EP | 0 920 203 A2 | 6/1999 |
| EP | 0940983 | 9/1999 |
| EP | 1003338 | 5/2000 |
| EP | 1043724 A1 | 10/2000 |
| EP | 1081885 | 3/2001 |
| EP | 1126454 | 8/2001 |
| EP | 1198132 | 4/2002 |
| EP | 1198133 | 4/2002 |
| EP | 1202568 | 5/2002 |
| JP | 64-003781 | 1/1989 |
| JP | 01-116819 | 5/1989 |
| JP | 11-66813 A | 6/1989 |
| JP | 08-088832 | 4/1996 |
| JP | 08-235833 | 9/1996 |
| JP | 09-023403 | 1/1997 |
| JP | 09-251759 | 9/1997 |
| JP | 10-032780 | 2/1998 |
| JP | 10-040667 | 2/1998 |
| JP | 10-51737 | 2/1998 |
| JP | 10-269698 | 10/1998 |
| JP | 10-271449 | 10/1998 |

| | | |
|---|---|---|
| JP | 10-299698 | 11/1998 |
| JP | 11-041563 | 2/1999 |
| JP | 11-103444 | 4/1999 |
| JP | 11-134812 | 5/1999 |
| JP | 11-185463 | 7/1999 |
| JP | 11-259976 | 9/1999 |
| JP | 11-346341 | 12/1999 |
| JP | 2000-030414 | 1/2000 |
| JP | 2000-041066 | 2/2000 |
| JP | 2000-069437 | 3/2000 |
| JP | 2000-113602 | 4/2000 |
| JP | 2000-149514 | 5/2000 |
| JP | 2000-235779 | 8/2000 |
| JP | 2000-293938 | 10/2000 |
| JP | 2000-299836 | 10/2000 |
| JP | 2000-348442 | 12/2000 |
| JP | 2001-024973 | 1/2001 |
| JP | 2001-24985 A | 1/2001 |
| JP | 2001-111944 | 1/2001 |
| JP | 2001-67802 | 3/2001 |
| JP | 2001-111929 | 4/2001 |
| JP | 2001-111960 | 4/2001 |
| JP | 2001-169246 | 6/2001 |
| JP | 2001-297535 | 10/2001 |
| JP | 2002-83486 A | 3/2002 |
| JP | 2002-112179 | 4/2002 |
| JP | 2002-150685 | 5/2002 |
| JP | 2002-158972 | 5/2002 |
| JP | 2002-158974 A | 5/2002 |
| JP | 2002-176623 A | 6/2002 |
| JP | 2002-216460 | 8/2002 |
| JP | 2002-222581 | 8/2002 |
| JP | 2003-087744 | 3/2003 |
| JP | 2003-116100 | 4/2003 |
| JP | 2006-503400 | 1/2006 |
| KR | 10-1999-0022858 | 10/1997 |
| KR | 10-2000-0031861 | 6/2000 |
| KR | 10-2000-0055028 | 9/2000 |
| KR | 10-2000-0056179 | 9/2000 |
| KR | 10-2000-0065876 | 11/2000 |
| KR | 10-2001-0022702 | 3/2001 |
| KR | 10-0294884 | 4/2001 |
| KR | 10-2001-0098007 | 11/2001 |
| KR | 10-2001-0098101 | 11/2001 |
| KR | 10-2001-0107578 | 12/2001 |
| KR | 10-2002-0006674 | 1/2002 |
| KR | 10-2002-0020919 | 1/2002 |
| KR | 10-2002-0097454 | 12/2002 |
| KR | 10-2002-0097455 | 12/2002 |
| KR | 10-2004-0000290 | 1/2004 |
| KR | 10-2004-0030992 | 4/2004 |
| KR | 10-2004-0030994 | 4/2004 |
| KR | 10-2004-0030995 | 4/2004 |
| KR | 10-2004-0041581 | 5/2004 |
| TW | 391548 | 5/2000 |
| WO | WO 97/06531 | 2/1997 |
| WO | WO 97/13364 | 4/1997 |
| WO | WO 97/13365 | 4/1997 |
| WO | WO 97/13366 | 4/1997 |
| WO | WO 97/39451 | 10/1997 |
| WO | WO 98/00952 | 1/1998 |
| WO | WO 99/08281 | 2/1999 |
| WO | WO 99/34601 | 7/1999 |
| WO | WO 00/02195 A2 | 1/2000 |
| WO | WO 00/05883 | 2/2000 |
| WO | WO 00/42515 | 7/2000 |
| WO | WO 00/62295 | 10/2000 |
| WO | WO 01/80239 | 10/2001 |
| WO | WO 01/82604 | 11/2001 |
| WO | WO 01/82606 | 11/2001 |
| WO | WO 01/82609 | 11/2001 |
| WO | WO 01/82610 | 11/2001 |
| WO | WO 2004/001748 A1 | 12/2003 |
| WO | WO 2004-001750 | 12/2003 |
| WO | WO 2004/001750 | 12/2003 |
| WO | WO 2004/001753 | 12/2003 |
| WO | WO 2004/045206 | 5/2004 |
| WO | WO 2004/075183 | 9/2004 |
| WO | WO 2004/077417 | 9/2004 |
| WO | WO 2004/079736 | 9/2004 |
| WO | WO 2004/081939 | 9/2004 |
| WO | WO 2004/086731 | 10/2004 |

OTHER PUBLICATIONS

Search Report for corresponding European application dated Dec. 28, 2007.
Search Report for corresponding European application dated Jan. 2, 2008.
Chinese Office Action dated Dec. 14, 2007.
Japanese Office Action dated Jan. 22, 2008.
European Search Report dated Dec. 28, 2007.
European Search Report dated Jan. 2, 2008.
United States Office Action dated Jan. 2, 2008.
United States Office Action dated Jan. 28, 2008.
Japanese Patent Office Action dated May 7, 2008, for corresponding Japanese Patent Application No. 2004-517368 (2 pp.).
Japanese Patent Office Action dated May 7, 2008, for corresponding Japanese Patent Application No. 2004-517390 (3 pp.).
European Patent Office Action dated Mar. 31, 2008, for corresponding European Patent Application No. 037611863.1-2223 (3 pp.).
Office Action for corresponding Japanese application dated Apr. 22, 2008.
Office Action for corresponding Japanese application dated May 20, 2008.
European Search Report dated Aug. 13, 2008.
International Search Report; Jun. 10, 2004.

RECORDING MEDIUM HAVING DATA STRUCTURE FOR MANAGING REPRODUCTION OF DATA STREAMS RECORDED THEREON AND RECORDING AND REPRODUCING METHODS AND APPARATUSES

DOMESTIC PRIORITY

This is a continuation application of application Ser. No. 11/802,659 filed May 24, 2007, which is a continuation of application Ser. No. 10/772,326 filed Feb. 6, 2004, now U.S. Pat. No. 7,224,664 the entire contents of all which are hereby incorporated by reference.

FOREIGN PRIORITY

This application claims priority under 35 U.S.C. 119 on Korean Application No. 10-2003-018416 filed Mar. 25, 2003; the entire contents of which are hereby incorporated by reference.

BACKGROUND OF THE INVENTION

1. Field of the Invention

The present invention relates to a recording medium having a data structure for managing reproduction of data streams recorded thereon as well as methods and apparatuses for reproduction and recording.

2. Description of the Related Art

The standardization of new high-density read only and rewritable optical disks capable of recording large amounts of high-quality video and audio data has been progressing rapidly and new optical disk related products are expected to be commercially available on the market in the near future. The Blu-ray Disc Rewritable (BD-RE) is one example of these new optical disks.

FIG. 1 illustrates the file structure of the BD-RE. The file structure or data structure provides for managing the reproduction of the video and audio data recorded on the BD-RE. As shown, the data structure includes a root directory that contains at least one BDAV directory. The BDAV directory includes files such as 'info.bdav', 'menu.tidx', and 'mark.tidx', a PLAYLIST subdirectory in which playlist files (*.rpls and *.vpls) are stored, a CLIPINF subdirectory in which clip information files (*.clpi) are stored, and a STREAM subdirectory in which MPEG2-formatted A/V stream clip files (*.m2ts) corresponding to the clip information files are stored. In addition to illustrating the data structure of the optical disk, FIG. 1 represents the areas of the optical disk. For example, the general information file info.bdav is stored in a general information area or areas on the optical disk.

Because the BD-RE data structure and disk format as illustrated in FIG. 1 is well-known and readily available, only a brief overview of the file structure will be provided in this disclosure.

As alluded to above, the STREAM directory includes MPEG2-formatted A/V stream files called clip files. The STREAM directory may also include a special type of clip referred to as a bridge-clip A/V stream file. A bridge-clip file is used for making seamless connection between two or more presentation intervals selected in the clip files, and generally have a small data size compared to clip files. The A/V stream includes source packets of video and audio data. For example, a source packet of video data includes a header and a transport packet. A source packet includes a source packet number, which is generally a sequentially assigned number that serves as an address for accessing the source packet. Transport packets include a packet identifier (PID). The PID identifies the sequence of transport packets to which a transport packet belongs. Each transport packet in the sequence will have the same PID.

The CLIPINF directory includes a clip information file associated with each A/V stream file. The clip information file indicates, among other things, the type of A/V stream associated therewith, sequence information, program information and timing information. The sequence information describes the arrival time basis (ATC) and system time basis (STC) sequences. For example, the sequence information indicates, among other things, the number of sequences, the beginning and ending time information for each sequence, the address of the first source packet in each sequence and the PID of the transport packets in each sequence. A sequence of source packets in which the contents of a program is constant is called a program sequence. The program information indicates, among other things, the number of program sequences, the starting address for each program sequence, and the PID(s) of transport packets in a program sequence.

The timing information is referred to as characteristic point information (CPI). One form of CPI is the entry point (EP) map. The EP map maps a presentation time stamp (e.g., on an arrival time basis (ATC) and/or a system time basis (STC)) to a source packet address (i.e., source packet number). The presentation time stamp (PTS) and the source packet number (SPN) are related to an entry point in the AV stream; namely, the PTS and its related SPN point to an entry point on the AV stream. The packet pointed to is often referred to as the entry point packet.

The PLAYLIST directory includes one or more playlist files. The concept of a playlist has been introduced to promote ease of editing/assembling clips for playback. A playlist file is a collection of playing intervals in the clips. Each playing interval is referred to as a playitem. The playlist file, among other things, identifies each playitem forming the playlist, and each playitem, among other things, is a pair of IN-point and OUT-point that point to positions on a time axis of the clip file (e.g., presentation time stamps on an ATC or STC basis). Expressed another way, the playlist file identifies playitems, each playitem points to a clip file or portion thereof and identifies the clip information file associated with the clip file. The clip information file is used, among other things, to map the playitems to the clip of source packets.

A playlist directory may include real playlists (*.rpls) and virtual playlists (*.vpls). A real playlist can only use clips and not bridge-clips. Namely, the real playlist is considered as referring to parts of clips, and therefore, conceptually considered equivalent in disk space to the referred to parts of the clips. A virtual playlist can use both clips and bridge-clips, and therefore, the conceptual considerations of a real playlist do not exist with virtual playlists.

The info.bdav file is a general information file that provides general information for managing the reproduction of the A/V stream recorded on the optical disk. More specifically, the info.bdav file includes, among other things, a table of playlists that identifies the file names of the playlist in the PLAYLIST directory of the same BDAV directory.

The menu.tidx, menu.tdt1 and menu.tdt2 files store information related to menu thumbnails. The mark.tidx, mark.tdt1 and mark.tdt2 files store information that relates to mark thumbnails. Because these files are not particularly relevant to the present invention, they will not be discussed further.

The standardization for high-density read-only optical disks such as the Blu-ray ROM (BD-ROM) is still under way.

An effective data structure for managing data streams, which may represent one or more reproduction paths, recorded on the high-density read-only optical disk such as a BD-ROM is not yet available.

SUMMARY OF THE INVENTION

The recording medium according to the present invention includes a data structure for managing reproduction of data streams, which may represent one or more reproduction paths (e.g., multiple camera angles), recorded on the recording medium.

In one exemplary embodiment, navigation data is stored in a navigation area of the recording medium. The navigation data is associated with a data stream representing a portion of at least one reproduction path. The navigation data includes indication information, and the indication information indicates whether the data stream represents multiple reproduction paths or the data stream represents a single reproduction path. If the indication information indicates the data stream represents multiple reproduction paths, the navigation data includes path number information and an indicator associated with each reproduction path. The path number information identifies a number of the multiple reproduction paths, and each indicator indicates a file associated with the associated one of the multiple reproduction paths.

The present invention further provides apparatuses and methods for recording and reproducing the data structure according to the present invention, and recording and reproducing data streams according to the present invention.

BRIEF DESCRIPTION OF THE DRAWINGS

The above features and other advantages of the present invention will be more clearly understood from the following detailed description taken in conjunction with the accompanying drawings, in which.

DESCRIPTION OF THE EMBODIMENTS

In order that the invention may be fully understood, exemplary embodiments thereof will now be described with reference to the accompanying drawings.

Figure 1:
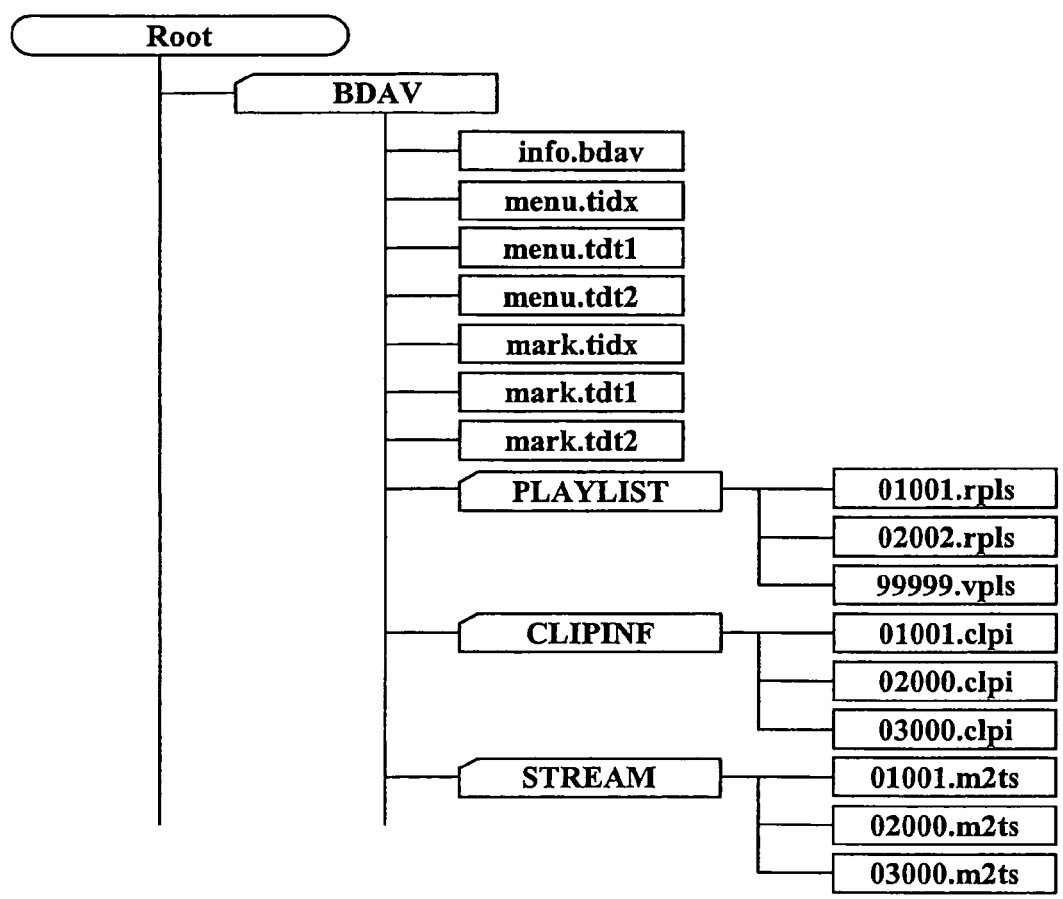
FIG. 1 illustrates the prior art file or data structure of a rewritable optical disk according to the Blu-ray Disc Rewritable (BD-RE) standard.
Figure 2:
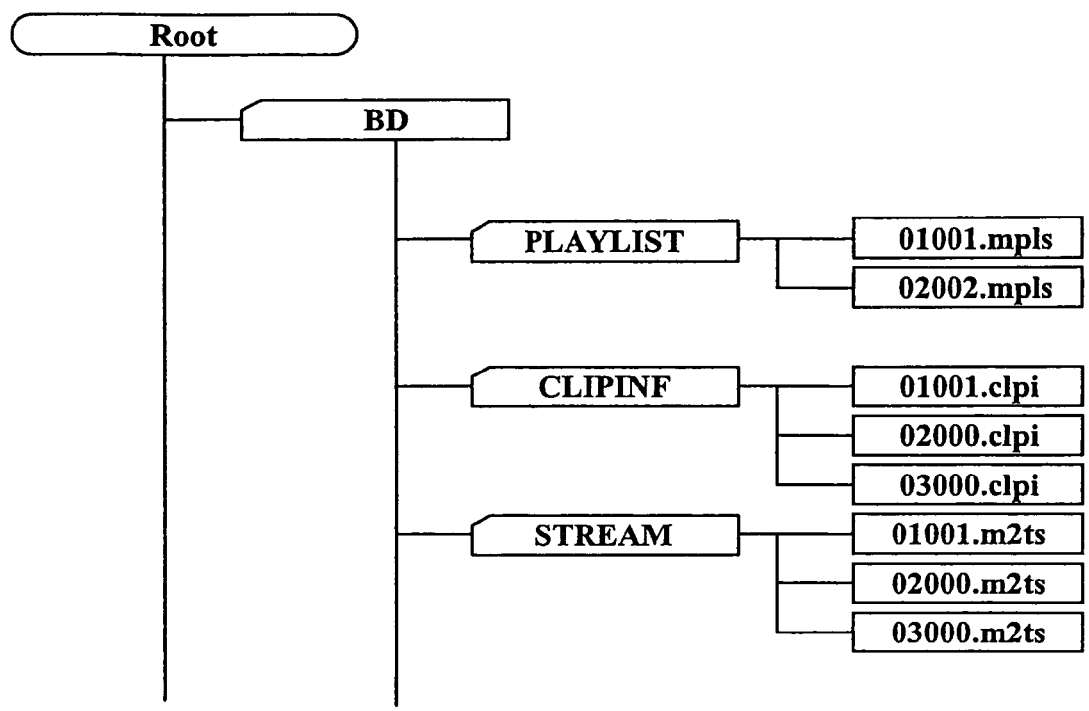
FIG. 2 illustrates an exemplary embodiment of a recording medium file or data structure according to the present invention.

A high-density recording medium such as a high density optical disk, for example, a Blu-Ray ROM (BD-ROM), BD-RE, etc. in accordance with the invention may have a file or data structure for managing reproduction of video and audio data as shown in FIG. 2. Some aspects of the data structure according to the present invention shown in FIG. 2 are the same as the well-known BD-RE standard, as such these aspects will be reviewed, but not described in great detail.

As shown in FIG. 2, the root directory contains at least one BD directory. The BD directory includes general files (not shown), a PLAYLIST directory in which playlist files (e.g., *.mpls) are stored, a CLIPINF directory in which clip information files (*.clpi) are stored, and a STREAM directory in which MPEG2-formatted A/V stream clip files (*.m2ts), corresponding to the clip information files, are stored.

The STREAM directory includes MPEG2-formatted A/V stream files called clip streams files or just clip files. The A/V stream includes source packets of video and audio data. For example, a source packet of video data includes a header and a transport packet. A source packet includes a source packet number, which is generally a sequentially assigned number that serves as an address for accessing the source packet. Transport packets include a packet identifier (PID). The PID identifies the sequence of transport packets to which a transport packet belongs. Each transport packet in the sequence will have the same PID.

The CLIPINF directory includes a clip information file associated with each A/V stream file. The clip information file indicates, among other things, the type of A/V stream associated therewith, sequence information, program information and timing information. The sequence information describes the arrival time basis (ATC) and system time basis (STC) sequences. For example, the sequence information indicates, among other things, the number of sequences, the beginning and ending time information for each sequence, the address of the first source packet in each sequence and the PID of the transport packets in each sequence. A sequence of source packets in which the contents of a program is constant is called a program sequence. The program information indicates, among other things, the number of program sequences, the starting address for each program sequence, and the PID(s) of transport packets in a program sequence.

The timing information is referred to as characteristic point information (CPI). One form of CPI is the entry point (EP) map. The EP map maps a presentation time stamp (e.g., on an arrival time basis (ATC) and/or a system time basis (STC)) to a source packet address (i.e., source packet number). The presentation time stamp (PTS) and the source packet number (SPN) are related to an entry point in the AV stream; namely, the PTS and its related SPN point to an entry point on the AV stream. The packet pointed to is often referred to as the entry point packet.

The PLAYLIST directory includes one or more playlist files. The concept of a playlist has been introduced to promote ease of editing/assembling clips (clip file and associated clip information file) for playback. A playlist file is a collection of playing intervals in the clip files. Each playing interval is referred to as a playitem. The playlist file, among other things, identifies each playitem forming the playlist, and each playitem, among other things, is a pair of IN-point and OUT-point that point to positions on a time axis of the clip file (e.g., presentation time stamps on an ATC or STC basis). The playlist file may also include sub-playitems that also provide a pair of IN-point and OUT-point that point to positions on a time axis of a clip file. Expressed another way, the playlist file identifies playitems and sub-playitems, each playitem or sub-playitem points to a clip file or portion thereof and identifies the clip information file associated with the clip file. The clip information file is used, among other things, to map the playitems to the clip file of source packets. Playlists may also include playlist marks which point to specific places (e.g., a specific address) in a clip file The general information files (not shown) provide general information for managing the reproduction of the A/V streams recorded on the optical disk.

Figure 3:
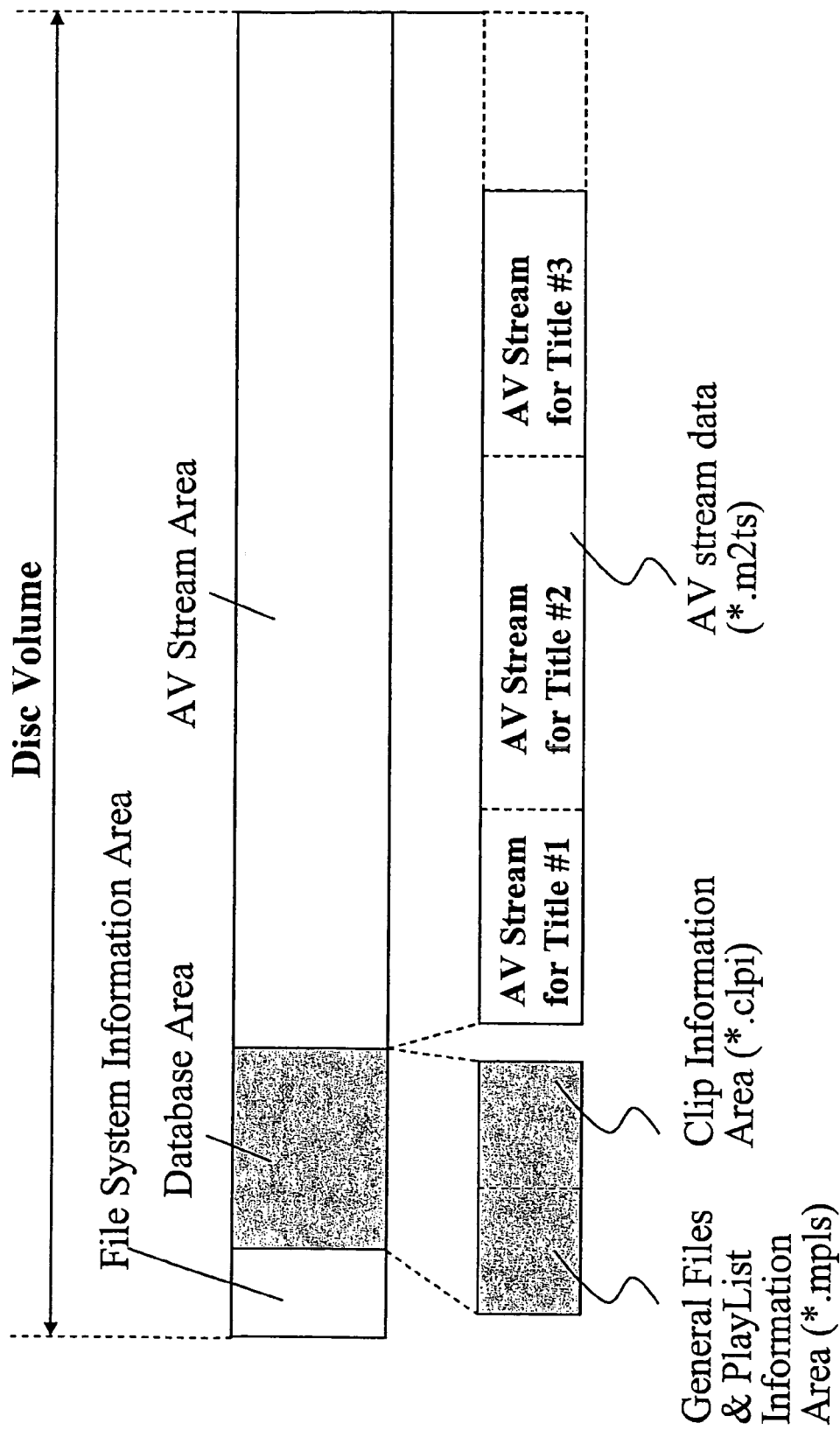
FIG. 3 illustrates an example of a recording medium having the data structure of FIG. 2 stored thereon.

In addition to illustrating the data structure of the recording medium according to an embodiment of the present invention, FIG. 2 represents the areas of the recording medium. For example, the general information files are recorded in one or more general information areas, the playlist directory is recorded in one or more playlist directory areas, each playlist in a playlist directory is recorded in one or more playlist areas of the recording medium, etc. FIG. 3 illustrates an example of a recording medium having the data structure of FIG. 2 stored thereon. As shown, the recording medium includes a file system information area, a data base area and an A/V stream area. The data base area includes a general information file and playlist information area and a clip information area. The general information file and playlist information area have the general information files recorded in a general information file area thereof, and the PLAYLIST directory and playlist files recorded in a playlist information area thereof. The clip information area has the CLIPINFO directory and associated clip information files recorded therein. The A/V stream area has the A/V streams for the various titles recorded therein.

Video and audio data are typically organized as individual titles; for example, different movies represented by the video and audio data are organized as different titles. Furthermore, a title may be organized into individual chapters in much the same way a book is often organized into chapters.

Because of the large storage capacity of the newer, high-density recording media such as BD-ROM and BD-RE optical disks, different titles, various versions of a title or portions of a title may be recorded, and therefore, reproduced from the recording media. For example, video data representing different camera angles may be recorded on the recording medium. As another example, versions of title or portions thereof associated with different languages may be recorded on the recording medium. As a still further example, a director's version and a theatrical version of a title may be recorded on the recording medium. Or, an adult version, young adult version and young child version (i.e., different parental control versions) of a title or portions of a title may be recorded on the recording medium. Each version, camera angle, etc. represents a different reproduction path, and the video data in these instances is referred to as multiple reproduction path video data.

Figure 4:
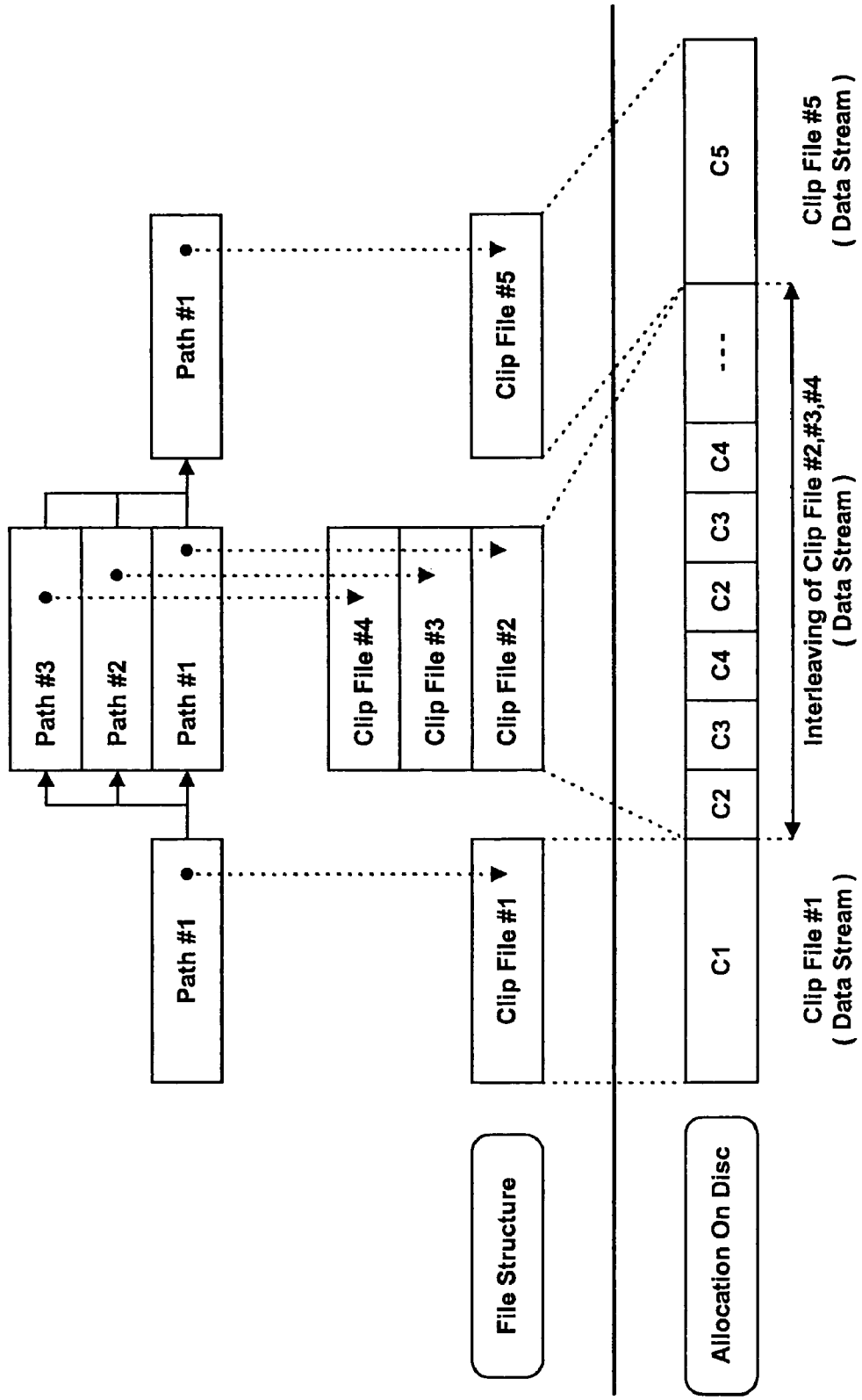
FIGS. 4-6 each illustrate a detailed embodiment of portions of the data structure in FIG. 1 and a method for managing still images of a high-density recording medium according to the present invention.

In a first embodiment of the present invention, data streams are managed as clip files, and each clip file is associated with a portion of a title. When a portion of the title has multiple reproduction paths, the clip files associated with the multiple reproduction path portion of the title are recorded in an interleaved fashion on the recording medium. FIG. 4 illustrates an example of a data structure and method for managing data streams of a high-density recording medium such as a BD-ROM according to this first embodiment. FIG. 4 illustrates a title having three portions; however, it will be understood that the present invention is not limited to having this number of portions. The first portion has a single, first reproduction path Path #1. The second portion has multiple reproduction paths; namely, the first reproduction path Path #1, a second reproduction path Path #2 and a third reproduction path Path #3. The third portion has a single reproduction path—the first reproduction path Path #1. The first reproduction path Path #1 is present in all three portions and may be thought of as a main reproduction path.

As further shown in FIG. 4, the data stream representing the first portion of the title, having the first reproduction path Path #1, is managed as a first clip file Clip File #1. The data streams representing the first, second and third reproduction paths Paths #1, #2 and #3 of the second portion of the title are managed as second, third and fourth clip files #2, #3 and #4, respectively. The data stream representing the third portion of the title, having the first reproduction path Path #1, is managed as a fifth clip file Clip File #5.

FIG. 4 further illustrates the allocation of the clip files on a data area of the BD-ROM. As shown, the first clip file Clip File #1 is recorded. Then, the second, third and fourth clip files Clip Files #2, #3 and #4 representing the multiple reproduction path portion of the title are recorded in interleaved fashion on the recording medium to permit seamless playback of any one of the reproduction paths. Subsequently, the fifth clip file Clip File #5 is recorded.

When it is unnecessary to perform seamless reproduction of the multiple reproduction path data streams, the data streams of the second, third, and fourth clip files Clip Files #2, #3 and #4 may be sequentially recorded clip file by clip file in a non-interleaved fashion.

During reproduction, the first, second, and fifth clip files Clip Files #1, #2 and #5 are selectively reproduced when a reproduction operation is carried out for the first reproduction path Path #1. When the second reproduction path is reproduced, the first, third, and fifth clip files Clip Files #1, #3 and #5 are selectively reproduced. And when the third reproduction path is reproduced, the first, fourth and fifth clip files Clip Files #1, #4 and #5 are selectively reproduced.

In order to assist achieving a seamless reproduction of the multiple reproduction path data streams, as described above, the data stream corresponding to the trailing end of the first clip file Clip File #1 and the data stream corresponding to the leading end of the interleaved second, third and fourth clip files #2, #3 and #4 are recorded adjacent to each other. Also, the data stream corresponding to the trailing end of the interleaved second, third and fourth clip files #2, #3 and #4 and the data stream corresponding to the leading end of the fifth clip file Clip File #5 are recorded adjacent to each other.

Figure 5:
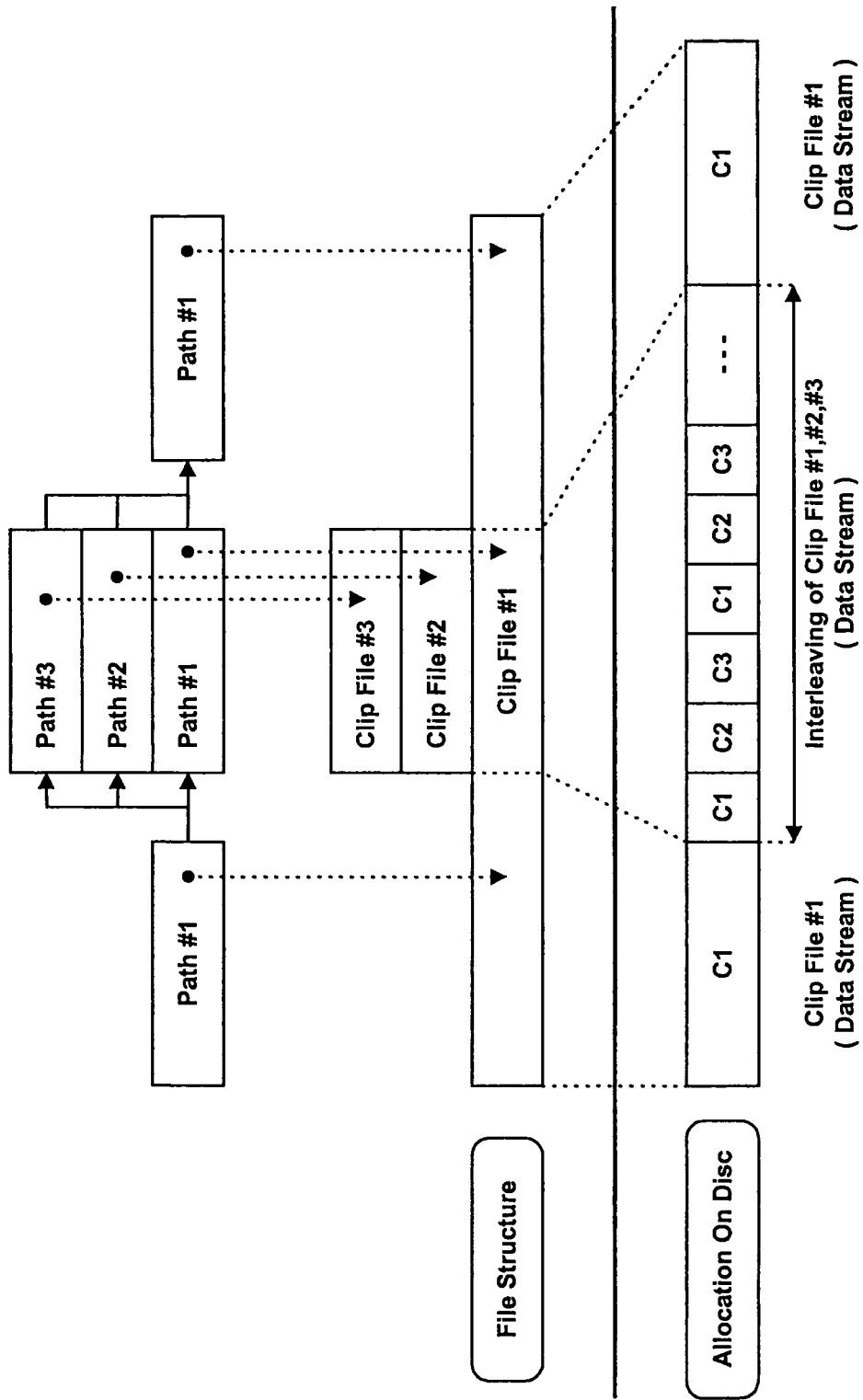

A second embodiment of the present invention is the same as the first embodiment described above, except that each reproduction path of the title is managed as a single clip file. FIG. 5 illustrates an example of this embodiment for the same title structure discussed above with respect to FIG. 4. As shown, the first reproduction path Path #1 is present in each of the three portions of the title, and the data stream of this reproduction path is managed as a single, first clip file Clip File #1. Again, the first reproduction path Path #1 may be thought of as a main reproduction path. The second portion of the title includes a second reproduction path Path #2 and a third reproduction path Path #3. The data streams of each of these reproduction paths are managed as individual clip files, second clip file Clip File #2 and third clip file Clip File #3, respectively.

In this embodiment, the clip files are recorded on the BD-ROM such that where the reproduction paths, and therefore at least portions of the clip files, represent the same portion of the title, the portions of the clip files representing that multiple reproduction path portion are recorded in an interleaved fashion. Accordingly, as shown in FIG. 5, the portion of the first clip file Clip File #1 associated with the second, multiple reproduction path portion of the title is recorded in interleaved fashion with the second and third clip files Clip Files #2 and #3, which also represent the second portion of the title.

Figure 6:
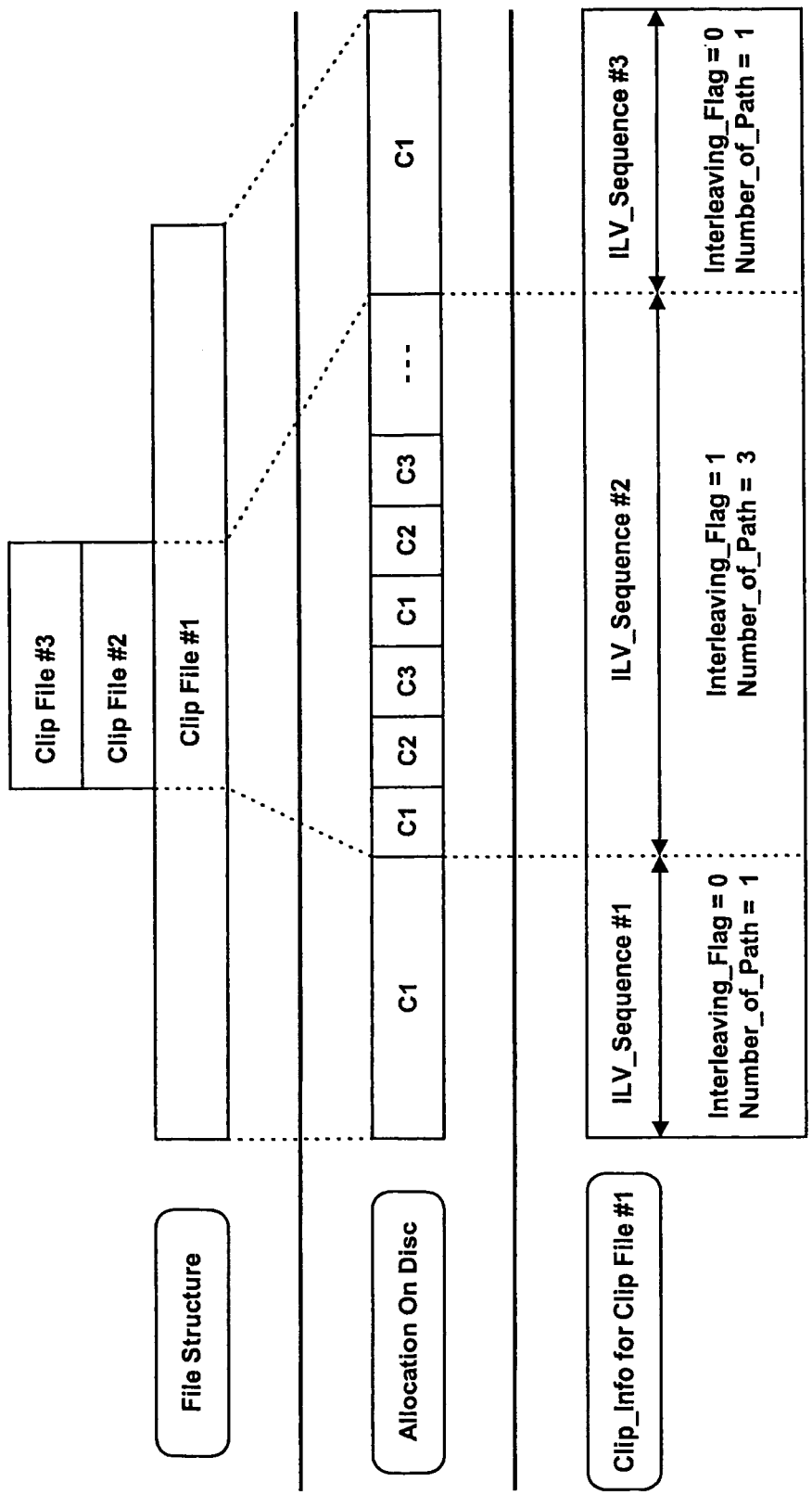

According to a further embodiment of the present invention, navigation data associated with the data stream representing each portion of the title may be recorded on the recording medium. The navigation data indicates whether associated data stream for the associated portion of the title is interleaved clip files; and therefore, indicates whether the data stream represents a multiple reproduction path portion of the title. The navigation data may also indicate the number of reproduction path represented by the associated data stream. FIG. 6 illustrates an example of this navigation data for the data structure illustrated and described above with respect to FIG. 5.

As shown in FIG. 6, a clip information file for clip file Clip File #1 of the main reproduction path includes the navigation data. Specifically, the clip information file includes interleaving sequence information ILV_Sequence for the data stream representing each portion of the title. The interleaving sequence information includes identification information Interleaving_Flag identifying an interleaved state of the associated data stream. Namely, the interleaving flag indicates whether the data stream represents the associated portion of the title is interleaved clip files or not. The interleaving sequence information also includes path number information Number_of_Path indicating the number of reproduction paths represented by the associated data stream.

As shown in FIG. 6, first, second, and third interleaving sequences ILV Sequences #1, #2 and #3 associated with the data streams representing the first, second and third portions of the title, respectively, are included in the first clip information file. The first interleaving sequence ILV_Sequence #1 is recorded with "Interleaving_Flag=0" indicating a non-interleaved state of the data stream (and thus a single reproduction path of data) and "Number_of_Path=1" explicitly indicating that the data stream of the first portion of the title represents one reproduction path.

The second interleaving sequence ILV_Sequence #2 is recorded with "Interleaving_Flag=1" indicating an interleaved state of the data stream (and thus multiple reproduction paths), and "Number_of_Path=3" indicating that the data streams of the second portion of the title represent three reproduction paths. The third interleaving sequence ILV_Sequence #3 is recorded with "Interleaving_Flag=0" indicating a non-interleaved state of the data stream (and thus a single reproduction path of data) and "Number_of Path=1" explicitly indicating that the data stream of the third portion of the title represent one reproduction path.

Figure 7:
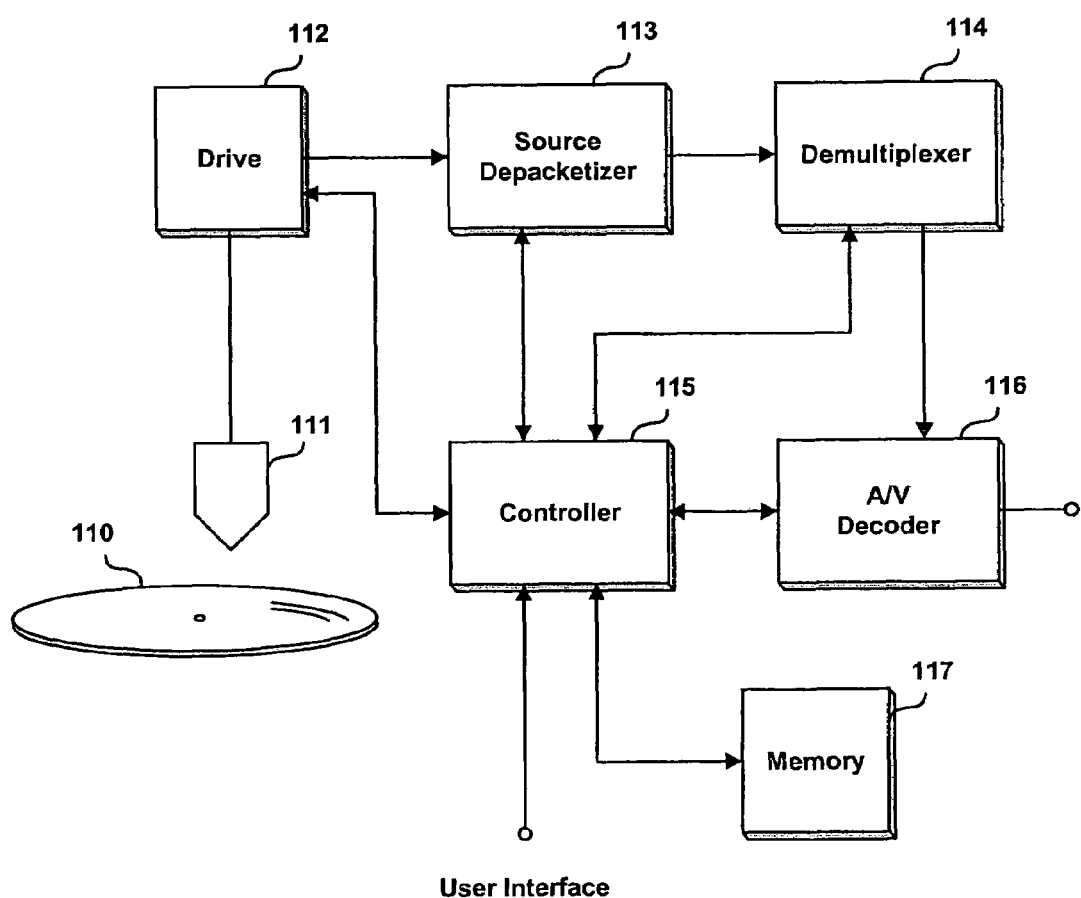
FIG. 7 illustrates a block diagram of an optical disc reproducing apparatus where the present invention is applied.

FIG. 7 illustrates an embodiment of an optical disk reproducing apparatus according to the present invention. As shown, the optical disk reproducing apparatus includes an optical pickup 111, a drive 112, a source depacketizer 113, a demultiplexer 114, a controller 115, an A/V decoder 116, and a memory 117. The drive 112 drives the optical pick-up to reproduce data from an optical disk 110. The drive 112 is controlled by the controller 115. During reproduction, the controller 115 controls the drive 112 to reproduce the data structure of one of the above-described embodiments. Based on the information contained therein, as well as user input received over a user interface (e.g., control buttons on the reproducing apparatus or a remote associated with the apparatus), the controller 115 controls the drive 112 to reproduce the data from the optical disk.

Reproduced source packets are received by the source depacketizer 113 and converted into a data stream (e.g., an MPEG-2 transport packet stream). The demultiplexer 115 demultiplexes the data stream into navigation/management and encoded AV data. The navigation/management data is sent to the controller 115 and stored in the memory 117. The AV decoder 116 decodes the encoded AV data to produce the originally recorded data. During reproduction, the controller 115 controls the operation of the source depacketizer 113, demultiplexer 114 and AV decoder 116.

An example of the operation of the optical disk reproducing apparatus will be described for the data structure illustrated in FIG. 6. Assume, a user requests reproduction of the data streams of the first path Path #1 via the user interface. In response, the controller 115 controls operations of the drive 112, source depacketizer 113, demultiplexer 114, and A/V decoder 116, based on the data structure.

Specifically, the controller 115 obtains the ILV sequence information for the first portion of the title. Here, the "Interleaving_Flag=0" and "Number_of Path=1", and the controller 115 determines that the associated data stream represents a single reproduction path of non-interleaved data. As such the controller 115 knows that the data stream represents the first or main reproduction path Path #1. Accordingly, the controller 115 reads out and reproduces the data stream of the first (main) reproduction path Path #1 recorded in the region associated with the first interleaving sequence information. Thereafter, the controller 115 obtains the ILV sequence information for the second portion of the title. Here, the controller 115 obtains an "Interleaving_Flag=1" and "Number_of_Path=3", and determines that the data streams for the second portion of the title represent three reproduction paths and the clip files associated therewith are interleaved as shown in FIG. 6. Namely, the controller 115 knows the first block of interleaved data is for the first reproduction path Path #1, the second block is for the second reproduction path Path #2, the third block is for the third reproduction path Path #3, the fourth block is for the first reproduction path Path #1, etc. Accordingly, the controller 115 selectively reproduces only the blocks associated with the first reproduction path Path #1. Alternatively or additionally, the clip information file may indicate the file extent or physical position of each block for each reproduction path on the recording medium, and the blocks for the selected reproduction path are reproduced based on the file extent information.

Subsequently, the controller 115 obtains the ILV sequence information for the third portion of the title. Here, the "Interleaving_Flag=0" and "Number_of_Path=1", and the controller 115 determines that the associated data stream represents a single reproduction path of non-interleaved data. As such the controller 115 knows that the data stream represents the first or main reproduction path Path #1. Accordingly, the controller 115 reads out and reproduces the data stream of the first (main) reproduction path Path #1 recorded in the region associated with the third interleaving sequence information.

Another example of the operation of the optical disk reproducing apparatus will be described for the data structure illustrated in FIG. 6. Assume, a user requests reproduction of the data stream of the second path Path #2 via the user interface. In response, the controller 115 controls operations of the drive 112, source depacketizer 113, demultiplexer 114, and A/V decoder 116, based on the data structure.

Specifically, the controller 115 obtains the ILV sequence information for the first portion of the title. Here, the "Interleaving_Flag=0" and "Number_of_Path=1", and the controller 115 determines that the associated data stream represents a single reproduction path of non-interleaved data. As such the controller 115 knows that the data stream represents the first or main reproduction path Path #1. Accordingly, the controller 115 reads out and reproduces the data stream of the first (main) reproduction path Path #1 recorded in the region associated with the first interleaving sequence information because the data stream associated with the second reproduction path Path #2 is understood not to be present. Thereafter, the controller 115 obtains the ILV sequence information for the second portion of the title. Here, the controller 115 obtains an "Interleaving_Flag=1" and "Number_of_Path=3", determines that the data stream for the second portion of the title represents three reproduction paths, and determines that the clip files associated therewith are interleaved as shown in FIG. 6. Namely, the controller 115 knows the first block of interleaved data is for the first reproduction path Path #1, the second block is for the second reproduction path Path #2, the third block is for the third path reproduction Path #3, the fourth block is for the first reproduction path Path #1, etc. Accordingly, the controller 115 selectively reproduces only the blocks associated with the second reproduction path Path #2. Alternatively or additionally, the clip information file may indicate the file extent or physical position of each block for each reproduction path on the recording medium, and the blocks for the selected reproduction path are reproduced based on the file extent information.

Subsequently, the controller 115 obtains the ILV sequence information for the third portion of the title. Here, the "Interleaving_Flag=0" and "Number_of_Path=1", and the controller 115 determines that the associated data stream represents a single reproduction path of non-interleaved data. As such the controller 115 knows that the data stream represents the first or main reproduction path Path #1. Accordingly, the controller 115 reads out and reproduces the data stream of the first (main) reproduction path Path #1 recorded in the region associated with the third interleaving sequence information because the data stream associated with the second reproduction path Path #2 is understood not to be present.

Figure 8:
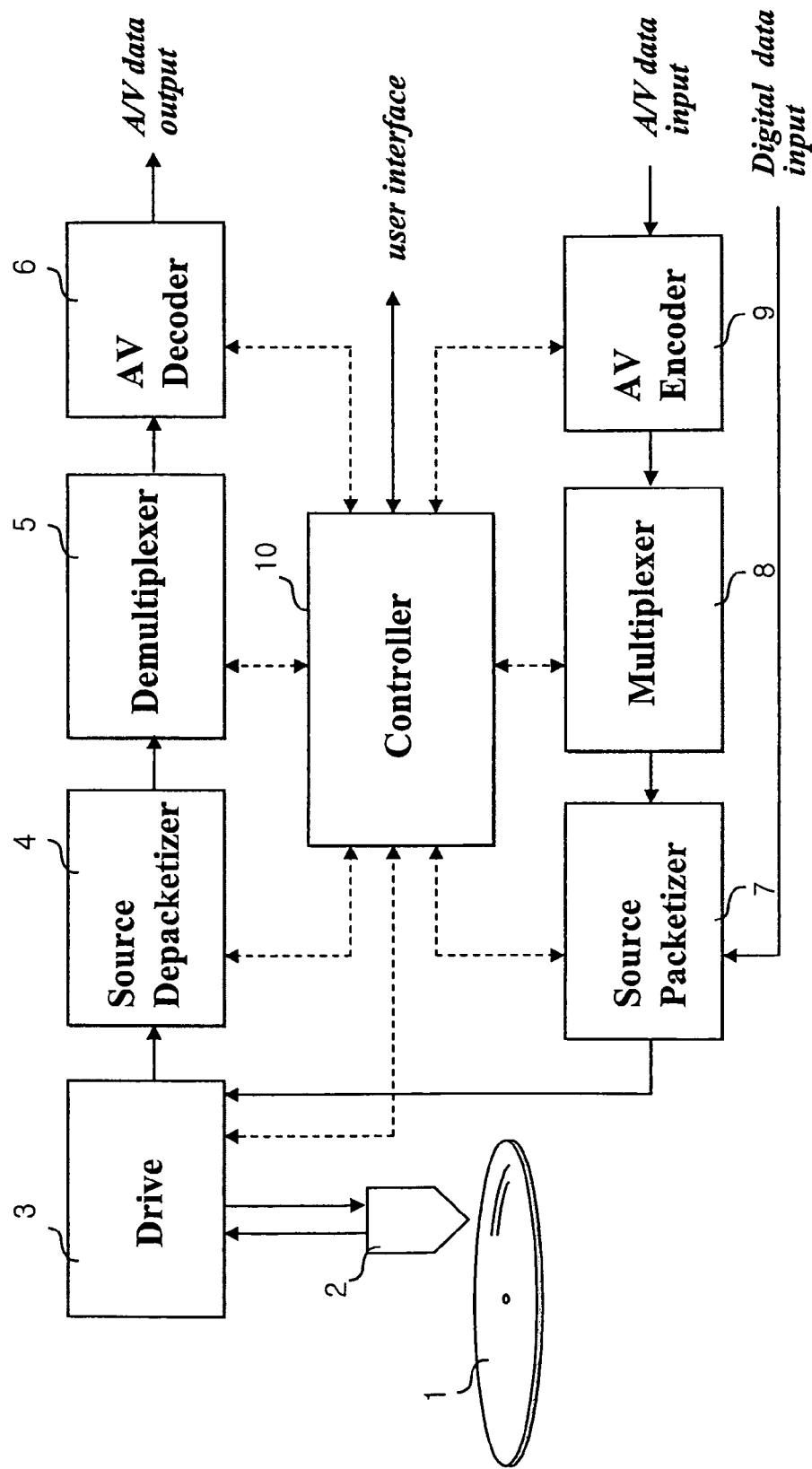
FIG. 8 illustrates an embodiment of a recording and reproducing apparatus according to the present invention.

FIG. 8 illustrates a schematic diagram of an embodiment of an optical disk recording and reproducing apparatus according to the present invention. As shown, an AV encoder 9 receives and encodes data (e.g., still image data, audio data, etc.). The AV encoder 9 outputs the encoded data along with coding information and stream attribute information. A multiplexer 8 multiplexes the encoded data based on the coding information and stream attribute information to create, for example, an MPEG-2 transport stream. A source packetizer 7 packetizes the transport packets from the multiplexer 8 into source packets in accordance with the audio/video format of the optical disk. As shown in FIG. 8, the operations of the AV encoder 9, the multiplexer 8 and the source packetizer 7 are controlled by a controller 10. The controller 10 receives user input on the recording operation, and provides control information to AV encoder 9, multiplexer 8 and the source packetizer 7. For example, the controller 10 instructs the AV encoder 9 on the type of encoding to perform, instructs the multiplexer 8 on the transport stream to create, and instructs the source packetizer 7 on the source packet format. The controller 10 further controls a drive 3 to record the output from the source packetizer 7 on the optical disk.

The controller 10 also creates the navigation and management information for managing reproduction of the data being recorded on the optical disk. For example, based on information received via the user interface (e.g., instruction set saved on disk, provided over an intranet or internet by a computer system, etc.) the controller 10 controls the drive 3 to record one or more of the data structures of FIGS. 2-6 on the optical disk.

During reproduction, the controller 10 controls the drive 3 to reproduce this data structure. Based on the information contained therein, as well as user input received over the user interface (e.g., control buttons on the recording and reproducing apparatus or a remote associated with the apparatus), the controller 10 controls the drive 3 to reproduce the data from the optical disk.

The reproduced source packets are received by a source depacketizer 4 and converted into a data stream (e.g., an MPEG-2 transport packet stream). A demultiplexer 5 demultiplexes the data stream into encoded data. An AV decoder 6 decodes the encoded data to produce the original data that was feed to the AV encoder 9. During reproduction, the controller 10 controls the operation of the source depacketizer 4, demultiplexer 5 and AV decoder 6. The controller 10 receives user input on the reproducing operation, and provides control information to AV decoder 6, demultiplexer 5 and the source packetizer 4. For example, the controller 10 instructs the AV decoder 9 on the type of decoding to perform, instructs the demultiplexer 5 on the transport stream to demultiplex, and instructs the source depacketizer 4 on the source packet format.

While FIG. 8 has been described as a recording and reproducing apparatus, it will be understood that only a recording or only a reproducing apparatus may be provided using those portions of FIG. 8 providing the recording or reproducing function.

The data structure for and method for managing data streams on a high-density optical disk in accordance with embodiments of the present invention allows effective selection and reproduction of data streams recorded on a high density recording medium such as a BD-ROM.

As apparent from the above description, the present invention provides methods and apparatuses for recording a data structure on a high density recording medium for managing data streams recorded on the recording medium.

The above description further provides methods and apparatus for reproducing data streams recorded on a high density recording medium based on a data structure, also recorded on the high density recording medium, for managing the reproduction of data streams.

While the invention has been disclosed with respect to a limited number of embodiments, those skilled in the art, having the benefit of this disclosure, will appreciate numerous modifications and variations there from. For example, while described with respect to a Blu-ray ROM optical disk in several instances, the present invention is not limited to this standard of optical disk or to optical disks. It is intended that all such modifications and variations fall within the spirit and scope of the invention.

What is claimed is:

1. A computer readable recording medium having a data structure for managing reproduction of a data stream, comprising:

a navigation area storing navigation data associated with at least one data stream of at least one reproduction path, the navigation data including first and second indication information, the first indication information indicating whether the navigation data is associated with the data streams of multiple reproduction paths or the navigation data is associated with the data stream of a single reproduction path, and if the first indication information indicates the navigation data is associated with the data streams of the multiple reproduction paths, the second indication information indicates whether or not the data streams of the multiple reproduction paths are associated with seamless reproduction.

2. The recording medium of claim 1, wherein the second indication information has a first value or a second value, the first value indicating the data streams are seamlessly reproduced, and the second value indicating the data streams are not seamlessly reproduced.

3. The recording medium of claim 1, further comprising:

a stream area storing the data streams of the multiple reproduction paths, the data streams including a plurality of data files, each data file representing one reproduction path.

4. The recording medium of claim 3, wherein the plurality of data files are interleaved each other.

5. The recording medium of claim 1, further comprising:
a data area storing at least one clip file of the at least one data stream, each clip file having one of the multiple reproduction paths if the first indication information indicates the navigation data is associated with the data streams of multiple reproduction paths.

6. The recording medium of claim 1, wherein the multiple reproduction paths represent multiple camera angles of video data.

7. A method of recording a data structure, for managing reproduction of a data stream, on a recording medium, comprising:
recording at least one data stream of at least one reproduction path on the recording medium; and,
recording navigation data associated with the at least one data stream of the at least one reproduction path, the navigation data including first and second indication information, the first indication information indicating whether the navigation data is associated with the data streams of multiple reproduction paths or the navigation data is associated with the data stream of a single reproduction path, and if the first indication information indicates the navigation data is associated with the data streams of the multiple reproduction paths, the second indication information indicates whether or not the data streams of the multiple reproduction paths are associated with seamless reproduction.

8. The method of claim 7, wherein the second indication information has a first value or a second value, the first value indicating the data streams are seamlessly reproduced, and the second value indicating the data streams are not seamlessly reproduced.

9. The method of claim 7, wherein the data streams of the multiple reproduction paths include a plurality of data files, each data file representing one reproduction path.

10. The method of claim 9, wherein the plurality of data files are interleaved with each other.

11. The method of claim 7, wherein the at least one data stream includes at least one clip file, each clip file having one of the multiple reproduction paths if the first indication information indicates the navigation data is associated with the data streams of the multiple reproduction paths.

12. The method of claim 7, wherein the multiple reproduction paths represent multiple camera angles of video data.

13. A method of reproducing a data structure for managing data streams, comprising:
accessing navigation data associated with at least one data stream of at least one reproduction path, the navigation data including first and second indication information, the first indication information indicating whether the navigation data is associated with the data streams of multiple reproduction paths or the navigation data is associated with the data stream of a single reproduction path, and if the first indication information indicates the navigation is associated with the data streams of the multiple reproduction paths, the second indication information indicates whether or not the data streams of the multiple reproduction paths are associated with seamless reproduction; and
reproducing the at least one data stream based on the accessed navigation data.

14. The method of claim 13, wherein the second indication information has a first value or a second value, the first value indicating the data streams are seamlessly reproduced, and the second value indicating the data streams are not seamlessly reproduced.

15. The method of claim 13, wherein the data streams of the multiple reproduction paths include a plurality of data files, each data file representing one reproduction path.

16. The method of claim 13, further comprising:
selectively accessing path number information from the navigation data based on the first and second indication information, the path number information identifying a number of the multiple reproduction paths; and
seamlessly reproducing the data streams of the multiple reproduction paths if the second indication information indicates the data streams are associated with seamless reproduction.

17. The method of claim 13, wherein the multiple reproduction paths represent multiple camera angles of video data.

18. An apparatus for recording a data structure for managing data streams, comprising:
a recording unit configured to record data on a recording medium, and;
a controller, operatively coupled to the recording unit, configured to control the recording unit to record navigation data associated with at least one data stream of at least one reproduction path, the navigation data including first and second indication information, the first indication information indicating whether the navigation data is associated with the data streams of multiple reproduction paths or the navigation data is associated with the data stream of a single reproduction path, and if the first indication information indicates the navigation data is associated with the data streams of the multiple reproduction paths, the second indication information indicates whether or not the data streams of the multiple reproduction paths are associated with seamless reproduction.

19. The apparatus of claim 18, wherein the second indication information has a first value or a second value, the first value indicating the data streams are seamlessly reproduced, and the second value indicating the data streams are not seamlessly reproduced.

20. The apparatus of claim 18, wherein the data streams of the multiple reproduction paths include a plurality of data files, each data file representing one reproduction path.

21. The apparatus of claim 20, wherein the plurality of data files are interleaved with each other.

22. The apparatus of claim 18, wherein the recording unit includes a pickup configured to record data on the recording medium, the controller is configured to control the pickup to record at least one clip file of the data stream on the recording medium, each clip file having one of the multiple reproduction paths if the first indication information indicates the navigation data is associated with the data streams of the multiple reproduction paths.

23. The apparatus of claim 18, wherein the multiple reproduction paths represent multiple camera angles of video data.

24. An apparatus for reproducing a data structure for managing a data stream, comprising:
a reproducing unit configured to reproduce data from a recording medium, and;
a controller, operatively coupled to the reproducing unit, configured to control the reproducing unit to read navigation data associated with at least one data stream of at least one reproduction path, the navigation data including first and second indication information, the first indication information indicating whether the navigation data is associated with the data streams of multiple reproduction paths or the navigation data is associated with the data stream of a single reproduction path, and if the first indication information indicates the navigation data is associated with the data streams of the multiple reproduction paths, the second indication information indicates whether or not the data streams of the multiple reproduction paths are associated with seamless reproduction.

25. The apparatus of claim 24, wherein the second indication information has a first value or a second value, the first value indicating the data streams are seamlessly reproduced, and the second value indicating the data streams are not seamlessly reproduced.

26. The apparatus of claim 24, wherein the data streams of the multiple reproduction paths include a plurality of data files, each data file representing one reproduction path.

27. The apparatus of claim 24, wherein the reproducing unit includes a pickup configured to reproduce data from the recording medium, the controller is configured to control the pickup to seamlessly reproduce the data streams of the multiple reproduction paths if the second indication information indicates the data streams are associated with seamless reproduction.

28. The method of claim 24, wherein the multiple reproduction paths represent multiple camera angles of video data.

* * * * *